United States Patent [19]

Cousins

[11] Patent Number: 5,141,439
[45] Date of Patent: Aug. 25, 1992

[54] KEYWORD TEACHING AND TESTING METHOD

[76] Inventor: Edward J. Cousins, P.O. Box 409, Sugar Land, Tex. 77478

[21] Appl. No.: 804,056

[22] Filed: Dec. 9, 1991

[51] Int. Cl.[5] ............................................. G09B 17/00
[52] U.S. Cl. .................................... 434/178; 434/162; 434/322
[58] Field of Search ........................ 434/178, 162, 322

[56] References Cited

U.S. PATENT DOCUMENTS

| | | | |
|---|---|---|---|
| 1,603,129 | 10/1926 | McDade | 434/178 |
| 4,008,529 | 2/1977 | Yorkston | 434/322 |
| 4,107,852 | 8/1978 | Epstein | 434/322 |
| 4,650,426 | 3/1987 | Brigance | 434/178 X |
| 5,007,838 | 4/1991 | Cochran | 434/178 |
| 5,061,185 | 10/1991 | Cochran et al. | 434/178 |

Primary Examiner—John J. Wilson
Assistant Examiner—Jeffrey A. Smith
Attorney, Agent, or Firm—Richard C. Litman

[57] ABSTRACT

A keyword teaching and testing method which includes teaching individuals how to become familiar with material and understand particular areas of interest by pinpointing keywords and grouping sentences according to main ideas. The method includes five readings of a segment of text. First, the student reads the segment of text simply to become familiar with the subject matter. During the course of a second reading, the same student underlines "keywords" and groups sentences. Prior to a third reading, the student physically deletes the underlined keywords from the text leaving blanks in the text. As the student reads the text for a third time, the student attempts to fill in the blanks relying on comprehension recall, skipping those blanks where comprehension fails. As the text is read for a fourth time, the incorrectly filled in blanks are corrected and the blanks which were skipped are now filled in. While reading the text for a fifth time, the student should be able to fill in substantially all of the blanks correctly. Upon completion of this 5 step procedure, the student answers a fill-in-the-blank practice questionnaire containing sentence fragments extracted from the book. Finally, all of the questions pre-prepared from the complete text book are used to administer the final unmarked open book timed test, which questions are randomly selected by the students.

8 Claims, 5 Drawing Sheets

KEYWORD TEACHING AND TESTING METHOD

BACKGROUND OF THE INVENTION

1. Field of the Invention

The present invention relates to a method of teaching individuals how to become familiar with the structure of a text, how to address a particular area of interest through the aide of grouping sentences according to main ideas and quickly pinpointing keywords.

2. Description of Prior Art

Standard or certified examinations are often required to be taken and passed with a certain degree of proficiency and accuracy in order to enter into a job or a trade or to merely change from one position to another. Often these examinations are of the open book type. This type of test demands that the student know where and how to access information from the text. The student must be capable of differentiating between what is important and what is not important. What are the main ideas and how are they arranged? What are the keywords or elements within these main ideas? Knowing where or how to find an answer or a solution to a problem is essential; being familiar with the text is repeatedly the most important factor in passing the test.

There are methods for optimizing reading skills or for outlining text. However, no method has been directed towards teaching individuals how to quickly access random information from a text.

U.S. Pat. No. 1,603,129 issued Oct. 12, 1926 to James E. McDade discloses an outlining device to aide in the development of reading carefully and analyzing what is being read.

U.S. Pat. No. 5,007,838 issued Apr. 16, 1991 to Kirby Cochran is a method and system for enhancing reading skills whereby reading can improve both reading and speed.

None of the above inventions and patents, taken either singly or in combination, is seen to describe the instant invention as claimed.

SUMMARY OF THE INVENTION

The present invention provides a method of teaching individuals how to familiarize themselves with and how to speedily attain information from printed matter. This method is notably useful in preparing individuals for certified and standardized open book test. It includes five readings of the same segment of text and the answering of two fill-in-the-blank questionnaires at the completion of the five readings. The first reading is a reading of an unaltered segment of text to obtain a basic familiarity of the subject matter contained within the segment of text. A second reading is an active reading whereby the student underlines key words and groups sentences in accord with the concept or idea being conveyed. The student, before performing a third reading, deletes those key words underlined providing blanks in the text where the keywords once existed. In a third reading, the student attempts to fill in all of the blanks relying strictly on comprehension recall. Those blanks which the student cannot fill in by recall are skipped or left blank. In the course of a fourth reading, the student corrects the incorrectly filled in blanks with a correct answer and fills in those blanks which were not filled in. In a fifth reading, the student should be able to fill in substantially all of the blanks relying strictly on comprehension. After the completion of the fifth and final reading, the student answers a fill-in-the-blank questionaire prepared verbatim from segments of the text. If more than one student is participating in this method at the same study session, each is given an opportunity to do a different segment of the text and complete the five step reading procedure. The students are now given a complete set of questions for the entire text book prepared with all the questions having the blank spaces in place and numbered in accordance with the sequence of chapters in the text book. The students now use these questions to practice "filling-in-the-blanks" from comprehension recall and going back into the book to find those words which they did not recall.

A final test is an open book test using a clean or unmarked and unaltered text. The test is conducted under a time constraint. The student randomly selects a predetermined number of question numbers for each chapter, each number corresponding to a fill-in-the-blank question. The student then gives the question numbers selected to a test moderator who compiles the questions corresponding to the question numbers to form a questionnaire. This method of selecting questions eliminates the risk of discrimination and reduces the risk of any two questionnaires being alike thus diminishing the risk of cheating and dismissing the chance of any one of the students becoming familiar with the questions asked in the exam. The student is responsible for filling in the blanks as well as listing the page number and the paragraph location where answer is found. Upon completion of this step, the student is familiar with the text used in a particular standardized test and has achieved a level of confidence to enable himself or herself to perform at their best on the exam.

Accordingly, one object of the present invention is to provide a method of teaching individuals how to become familiar with the structure of a text used in conjunction with a standardized or certified test.

Another object of the present invention is to provide a method of teaching individuals how to rapidly address a particular area of interest located within a segment of text.

Yet another object of the present invention is to provide a method of teaching individuals how to become familiar with keywords and phrases of a segment of text.

Further, an object of the present invention is to provide a method of teaching individuals which incorporates the administration of a test that substantially alleviates discriminatory elements.

These and other objects of the present invention will become readily apparent upon further review of the following specification and drawings.

BRIEF DESCRIPTION OF THE DRAWINGS

FIG. 1C is a view of the same student deleting the previously underlined keywords.

FIG. 1D is a view of the same student filling in by recall the keywords previously deleted, leaving blank those keywords not subject to recall.

FIG. 1E is a view of the same student erasing those incorrect key words previously filled in.

Similar reference characters denote corresponding features consistently throughout the attached drawings.

DETAILED DESCRIPTION OF THE PREFERRED EMBODIMENTS

Figure 1B:
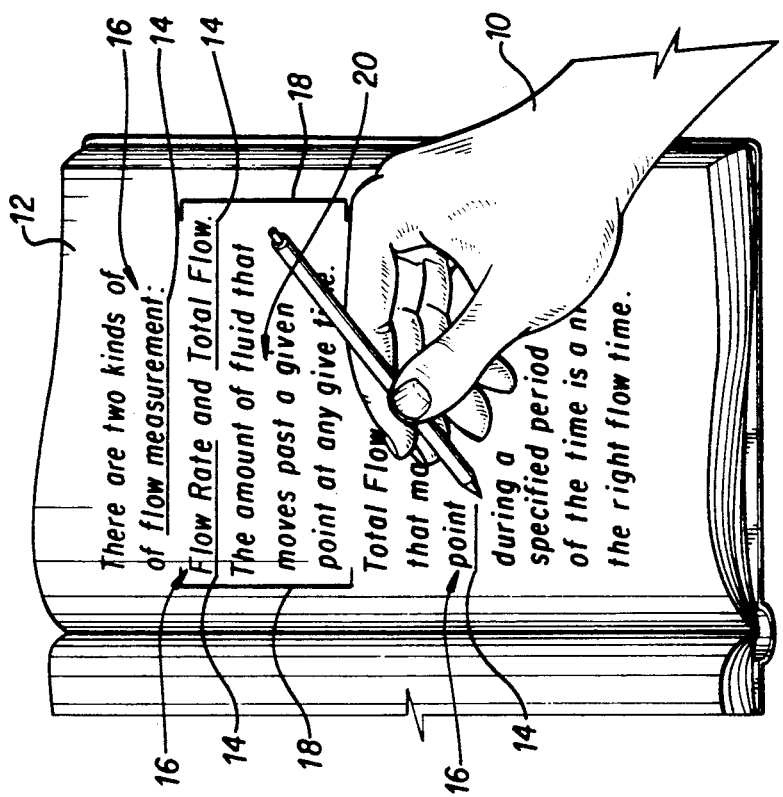
FIG. 1B is a view of the same student underlining or highlighting keywords and bracketing text in accordance with an idea conveyed.
Figure 1A:
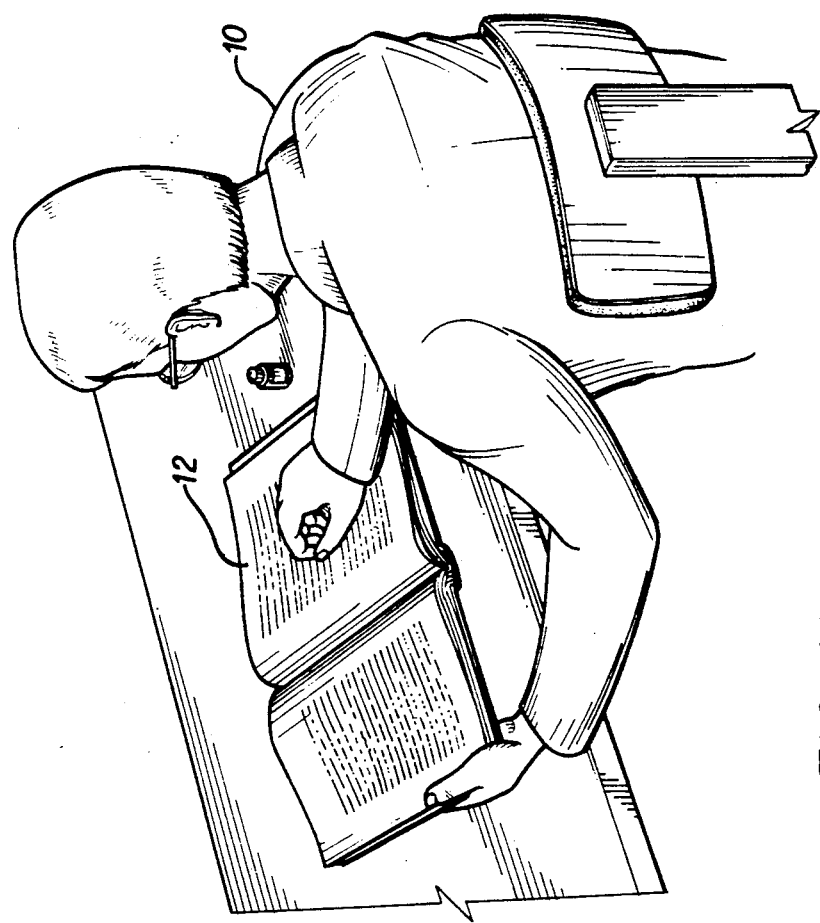
FIG. 1A is a rear view of a student reading a segment of text to become familiar with the subject matter covered within the segment of text.
Figures 1C, 1D, 1E:
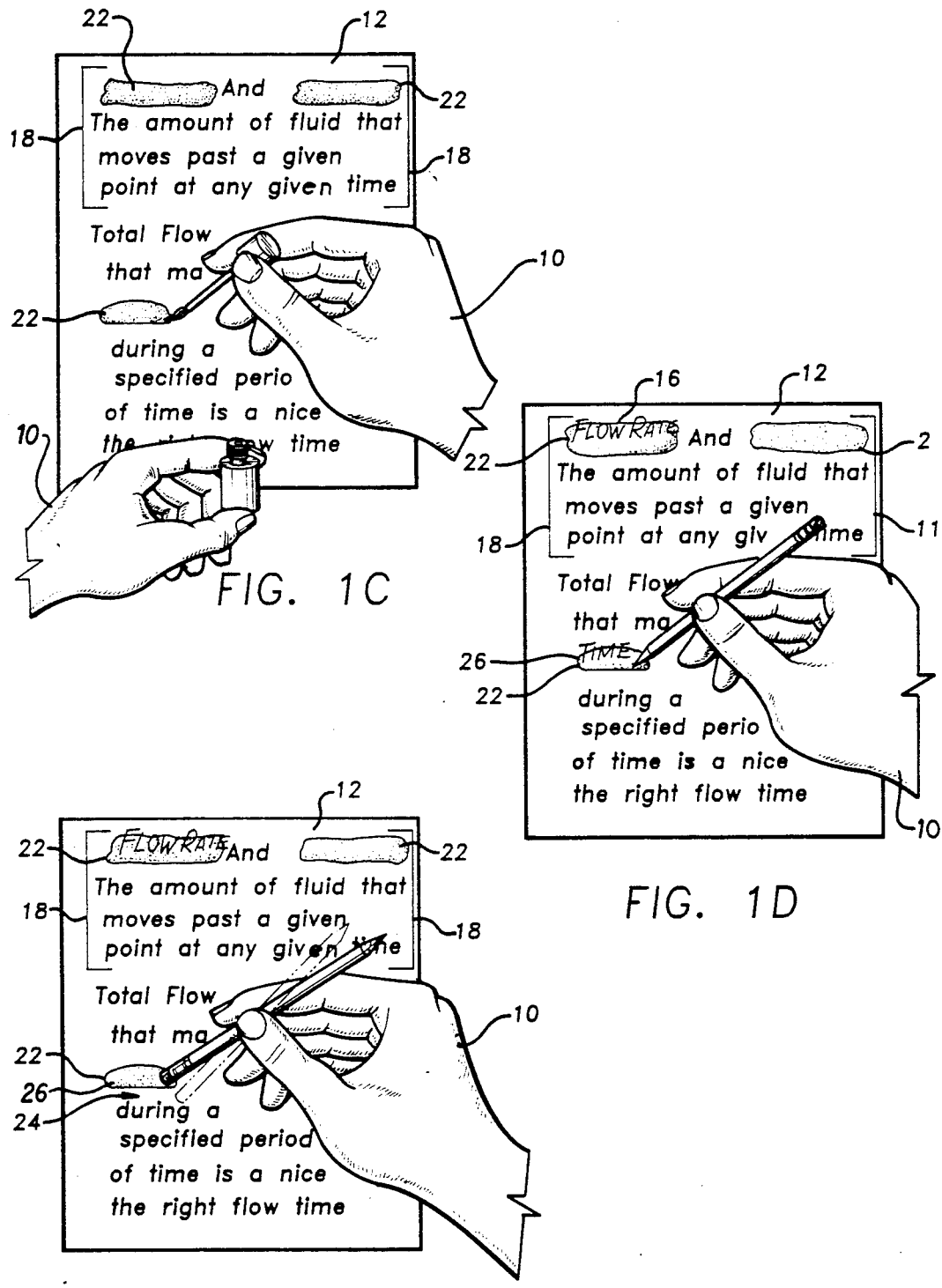
Figure 1F:
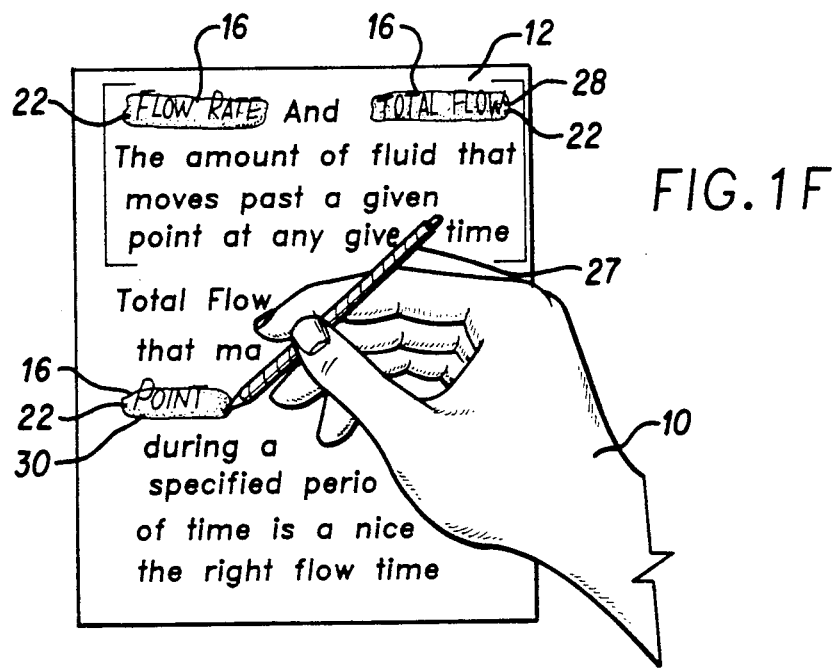
FIG. 1F is a view of the same student entering the correct keywords and those keywords not previously subject to recall.
Figure 2:
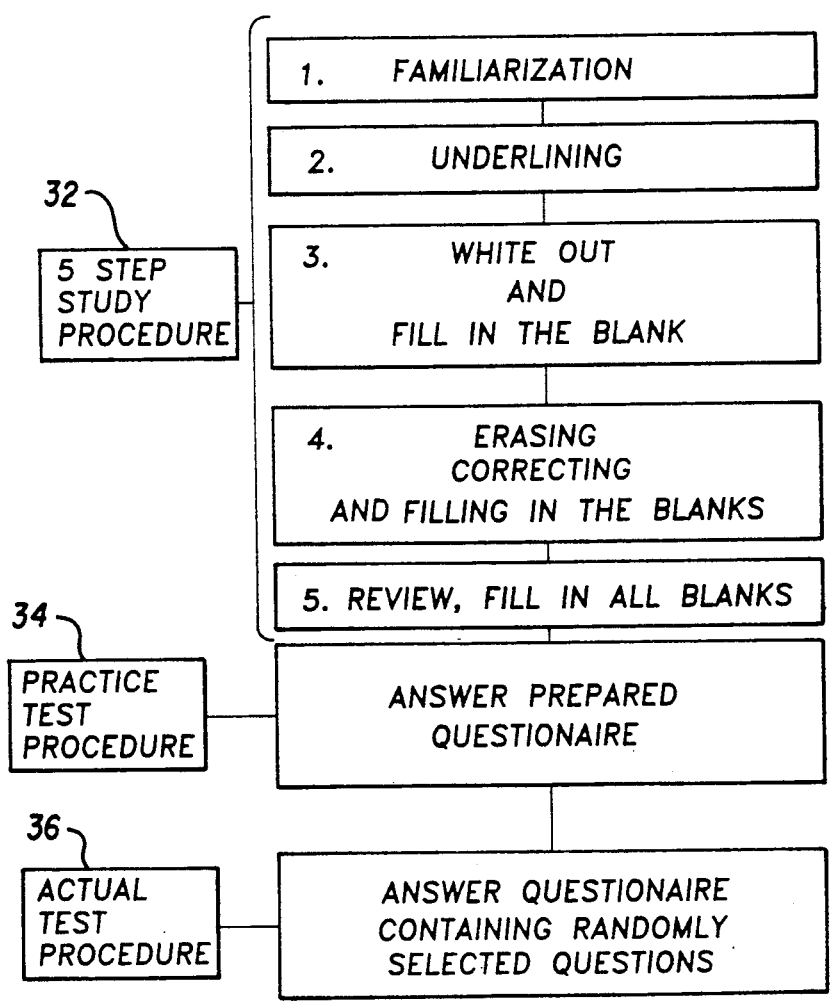
FIG. 2 is a block diagram of the method according to the present invention.
Figure 3:
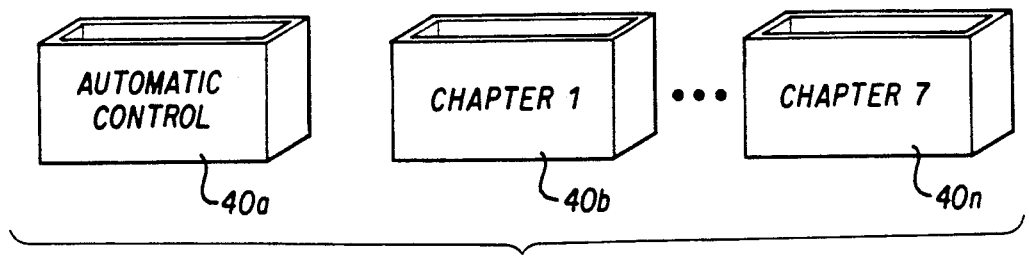
FIG. 3 is a perspective view showing boxes containing the question numbers randomly selected under the actual test procedure of the method according to the present invention.
Figure 4:
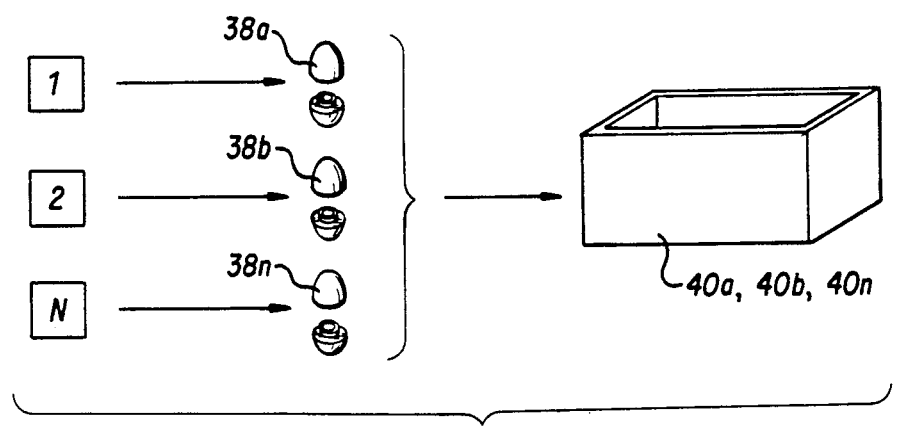
FIG. 4 is a perspective view of the capsules contained in the boxes which contain the question numbers randomly selected under the actual test procedure of the method according to the present invention.
Figure 5:
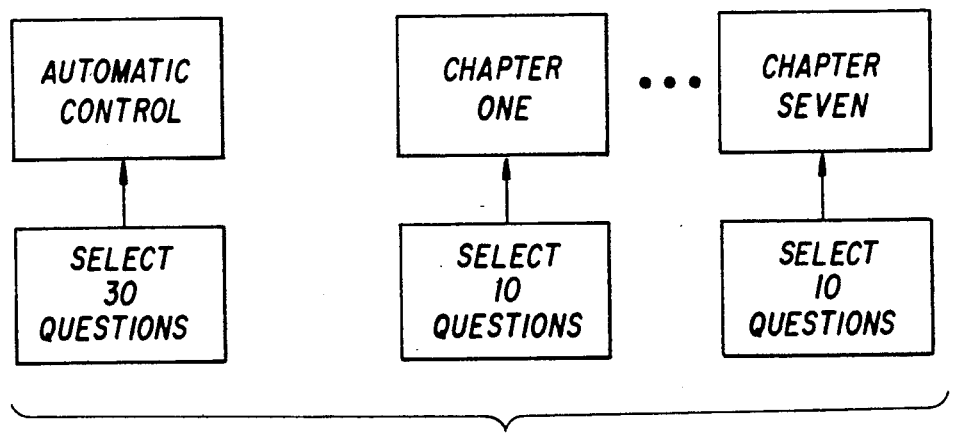
FIG. 5 is a block diagram of the questions selected in accordance with each chapter under the actual test procedure of the method according to the present invention.
Figure 6:
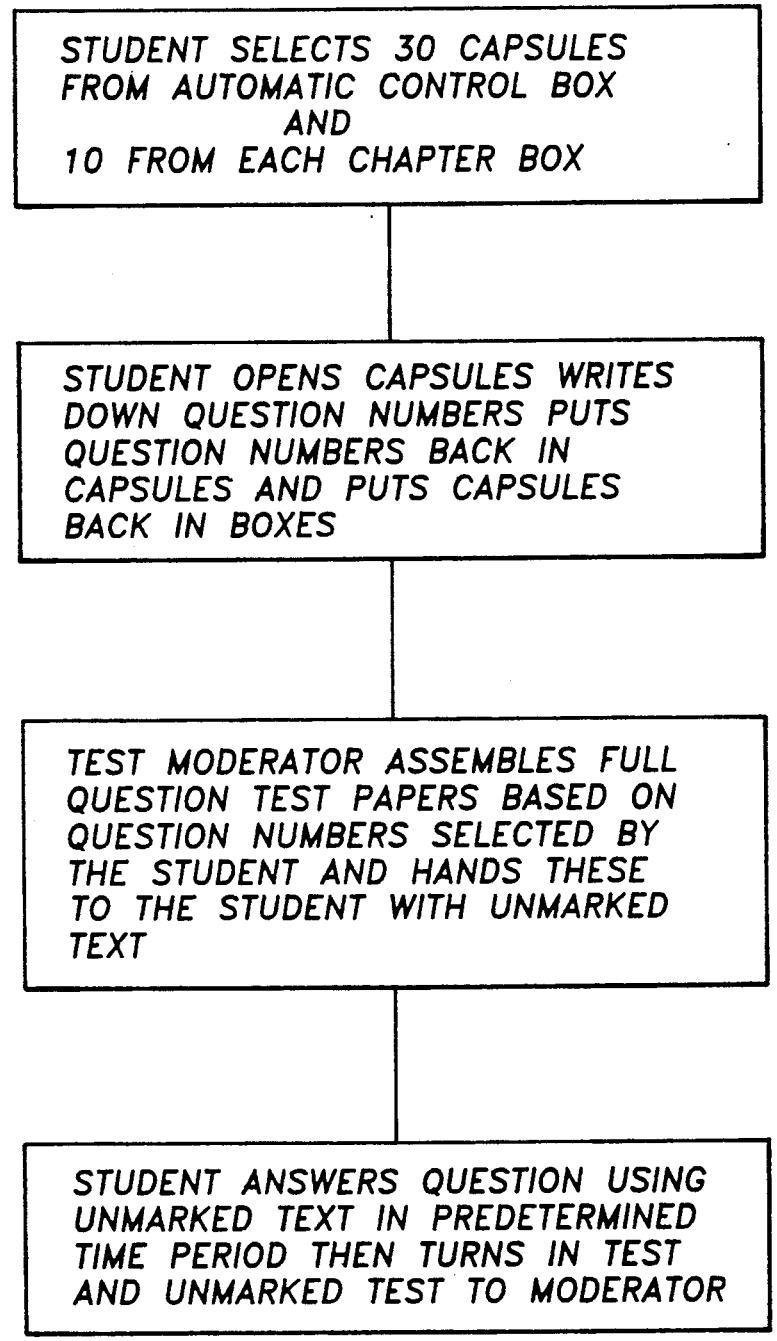
FIG. 6 is a block diagram of actual test procedure of the method according to the present invention.

Now referring to the drawings, FIG. 1A-1F and FIG. 2 show the five step study procedure and the two test procedures according to the method of the present invention. FIG. 1A and FIG. 2 show a student 10 reading an assigned portion of a book 12 in order to obtain a generalized knowledge of the subject matter assigned as is in accordance with STEP 1. of the 5 STEP PROCEDURE 32 (FIG. 2). FIG. 1B and FIG. 2 illustrates the same student 10 again reading the same segment of the book 12 and in agreement with STEP 2. of the 5 STEP PROCEDURE 32, underlining 14 or high-lighting keywords 16 and bracketing 18 key phrases 20. STEP 3. of the 5 STEP PROCEDURE 32 is depicted in FIG. 1C and 1D and FIG. 2 whereby the keywords 16 are deleted, such as with typewriter correction fluid, to provide blanks 22 and during a third reading of the same book 12, the blanks 22 are filled in with those keywords 16 which can be recalled from the students 10 comprehension; those keywords 16 not subject to comprehension recall are left unanswered. In a fourth reading of the book 12, FIG. 1E and 1F and FIG. 2 show the student 10 erasing 24 the incorrect answers 26 and with a red pen 27 writing the correct keyword 16 in the blanks 28, 30 which were unknown or incorrect. respectively. FIG. 1B and FIG. 2 represent the final step in the 5 STEP PROCEDURE 32, STEP 5., which includes a fifth reading by the student 10 as the student 10 fills in all of the blanks 22 from comprehension recall.

As shown in FIG. 2, upon the completion of the 5 STEP PROCEDURE 32, the student 10 completes a PRACTICE TEST PROCEDURE 34 which is a fill-in-the-blank test prepared verbatim from segments of the test. This PRACTICE TEST PROCEDURE 34 is an open book test used in conjunction with a book 12 in an original, unmarked form. The student 10 is required to find the answers within the book 12, fill in the blank, and place the page number and the paragraph number in the answer section provided.

FIGS. 2-6 reveal the final phase, the ACTUAL TEST PROCEDURE 36, of the method in both graphic form and in block diagram. Over the course of this ACTUAL TEST PROCEDURE 36, the student 10 selects a certain number of capsules 38a, 38b, . . . , 38n from a box 40a, 40b, . . . , 40n. Each capsule 38a, 38b, . . . , 38n contains a question number. One box 40a, 40b, . . . , 40n is designated for each chapter. After the student 12 selects a capsule 38a, 38b, . . . , 38n, he opens the capsule 38a, 38b, . . . , 38n to find a question number on a rolled up piece of paper. The student 10 jots down this number, rolls the piece of paper up, returns it to the capsule 38a, 38b, . . . , 38n, closes and returns the capsule 38a, 38b, . . . , 38n to the appropriate box 40a, 40b, . . . , 40n. After the required number of question numbers have been obtained for each chapter, the student 10 turns the question numbers over to a moderator who compiles the fill-in-the-blank questions corresponding to the question numbers in a single random selection questionnaire. The moderator issues the random selection questionnaire and a clean, unmarked book 12 to the student 10. The student is responsible for finding the answers to fill in the blanks as well as providing the page number and the paragraph where the answer was acquired. The student 10 must complete the random selection questionnaire within a limited, predetermined time period. After the random selection questionnaire is completed, the student 10 is to turn in the random selection questionnaire for correction along with the book 12 to the moderator.

As an example of the ACTUAL TEST PROCEDURE 36 in an application, a book 12 contains an automatic control section and seven chapters (chapter 1 through 7). One box 40a, 40b, . . . , 40n is designated per chapter to contain a number of capsules 38a, 38b, . . . , 38n, between 200 and 400, each containing a different question number. The student is responsible for retrieving thirty question numbers from the automatic control box, and ten questions from each of the seven boxes 40a, 40b, . . . , 40n designated to a chapter. The questions are given to a moderator who formats a random selection questionnaire from the question numbers. This random selection questionnaire is forwarded to the student 10 along with a clean copy of the book 12. The student has fifty minutes to complete the one hundred randomly selected questions. Upon the completion of the exam, the questionnaire is turned in to be corrected along with the clean copy of the book 12. The questionnaire is corrected and returned to the student 10.

It is to be understood that the present invention is not limited to the embodiments described above, but encompasses any and all embodiments within the scope of the following claims.

I claim:

1. A method of learning and retaining information by keyword methodology comprising the steps of:
    a. reading an assigned amount of information to establish basic knowledge of the subject matter covered by the assigned information;
    b. again reading the information and highlighting keywords within the assigned information;
    c. deleting the keywords and filling in the keywords by comprehension recall, leaving blank those keywords not subject to recall;
    d. correcting incorrect keywords and entering keywords not previously subject to comprehension recall; and
    e. reviewing information by beginning again with assigned information having all keywords deleted and filling in all keywords subject to comprehension recall.

2. The invention as claimed in claim 1 further comprising an actual testing procedure including the steps of:

a. randomly selecting a predetermined number of questions identified by number only from a predetermined number of containers filled with such question numbers;
b. noting the selected questions and returning the question numbers to their respective containers;
c. matching question numbers with complete questions that must be answered;
d. answering the questions selected; and
e. determining the questions correctly answered.

3. The invention as claimed in claim 1 wherein said again reading the information step further comprises grouping together sets of sentences from the assigned information that convey single concepts or ideas.

4. The invention as claimed in claim 3 further comprising an actual testing procedure including the steps of:
   a. randomly selecting a predetermined number of questions identified by number only from a predetermined number of containers filled with such question numbers;
   b. noting the selected questions and returning the question numbers to their respective containers;
   c. matching the question numbers with the complete questions that must be answered;
   d. answering the questions selected; and
   e. determining the questions correctly answered.

5. The invention as claimed in claim 3 further comprising a practice test procedure involving filling in keywords on a prepared questionnaire which is separate and apart from the original assigned information.

6. The invention as claimed in claim 5 further comprising an actual testing procedure including the steps of:
   a. randomly selecting a predetermined number of questions identified by number only from a predetermined number of containers filled with such question numbers;
   b. noting the selected questions and returning the question numbers to their respective containers;
   c. matching the question numbers with the complete questions that must be answered;
   d. answering the questions selected; and
   e. determining the questions correctly answered.

7. The invention as claimed in claim 1 further comprising a practice test procedure involving filling in keywords on a prepared questionnaire which is separate and apart from the original assigned information.

8. The invention as claimed in claim 7 further comprising an actual testing procedure including the steps of:
   a. randomly selecting a predetermined number of questions identified by number only from a predetermined number of containers filled with such question numbers;
   b. noting the selected questions and returning the question numbers to their respective containers;
   c. matching the question numbers with the complete questions that must be answered;
   d. answering the questions selected; and
   e. determining the questions correctly answered.

* * * * *